US012247469B2

(12) United States Patent
Bori et al.

(10) Patent No.: US 12,247,469 B2
(45) Date of Patent: Mar. 11, 2025

(54) ELECTRICAL SUBMERSIBLE PUMP FOR A WELLBORE

(71) Applicant: Saudi Arabian Oil Company, Dhahran (SA)

(72) Inventors: Mostafa M. Bori, Qatif (SA); Hashim A. Alsadah, Safwa (SA); Matias S. Funes, Ras Tanura (SA); Ahmed A. Khalaf, Safwa (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 18/447,796

(22) Filed: Aug. 10, 2023

(65) Prior Publication Data

US 2025/0052138 A1 Feb. 13, 2025

(51) Int. Cl.
*E21B 43/12* (2006.01)
*F04D 13/08* (2006.01)
*F04D 13/10* (2006.01)

(52) U.S. Cl.
CPC .......... *E21B 43/128* (2013.01); *F04D 13/086* (2013.01); *F04D 13/10* (2013.01); *F05D 2300/1723* (2013.01); *F05D 2300/173* (2013.01); *F05D 2300/174* (2013.01); *F05D 2300/222* (2013.01); *F05D 2300/505* (2013.01)

(58) Field of Classification Search
CPC ...... E21B 43/128; F04D 13/086; F04D 13/10; F05D 2300/1723; F05D 2300/173; F05D 2300/174; F05D 2300/222; F05D 2300/505
See application file for complete search history.

(56) References Cited

U.S. PATENT DOCUMENTS

| | | | | |
|---|---|---|---|---|
| 6,763,899 | B1 * | 7/2004 | Ossia | E21B 4/02 340/855.8 |
| 8,066,476 | B2 | 11/2011 | Orban et al. | |
| 2002/0074742 | A1 * | 6/2002 | Quoiani | F16J 15/0806 277/627 |
| 2009/0151928 | A1 * | 6/2009 | Lawson | E21B 43/36 96/216 |
| 2015/0132159 | A1 * | 5/2015 | Wilson | E21B 47/017 417/410.1 |

(Continued)

FOREIGN PATENT DOCUMENTS

| | | |
|---|---|---|
| CA | 3054585 | 6/2021 |
| WO | WO 2018186965 | 10/2018 |

*Primary Examiner* — Robert E Fuller
*Assistant Examiner* — Neel Girish Patel
(74) *Attorney, Agent, or Firm* — Fish & Richardson P.C.

(57) ABSTRACT

A downhole pumping system includes an electric motor configured to receive electric power from a cable coupled to a power source at a terranean surface; and a submersible pump coupled to the electric motor and positionable within a wellbore formed from the terranean surface toward a subterranean formation. The submersible pump is configured to circulate a wellbore fluid through the wellbore toward the terranean surface. The submersible pump includes a plurality of radial stages, with at least one radial stage including one or more shape members integrated with, attached to, or made a part of one or more surfaces of the submersible pump. Each of the one or more shape members is configured to undergo a shape change based at least in part on a characteristic of the wellbore fluid.

20 Claims, 3 Drawing Sheets

(56) References Cited

U.S. PATENT DOCUMENTS

| | | | | |
|---|---|---|---|---|
| 2015/0204336 | A1* | 7/2015 | McManus | F04D 29/0413 415/203 |
| 2018/0172010 | A1* | 6/2018 | Melo | F04D 29/026 |
| 2018/0172020 | A1* | 6/2018 | Ejim | F04D 29/44 |
| 2018/0291917 | A1* | 10/2018 | Webster | F04D 13/10 |
| 2023/0051162 | A1* | 2/2023 | Ye | F04D 13/10 |
| 2024/0175465 | A1* | 5/2024 | Ekambaram | H02K 5/132 |

* cited by examiner

ELECTRICAL SUBMERSIBLE PUMP FOR A WELLBORE

TECHNICAL FIELD

The present disclosure describes apparatus, systems, and methods associated with an electrical submersible pump (ESP) for a wellbore.

BACKGROUND

An electrical submersible pump (ESP) is one of many types of pumps that can be used in a well to circulate hydrocarbon fluids to the surface. An ESP operates as a fluid lifting mechanism for oil or water wells through sequential centrifugal stages. The stages convert fluid kinetic energy to potential energy (developing head) to lift the fluid from one stage to another stage and eventually through downhole tubing to the surface. ESP stages designs can encounter multiple challenges including poor performance of fluid lifting due to improper design caused by fluid data changes over time, or inaccurately estimated design parameters inputs such as fluid characteristics (water-cut), reservoir pressure, or incorrect design selection of motor or pump type.

SUMMARY

In an example implementation, a downhole pumping system includes an electric motor configured to receive electric power from a cable coupled to a power source at a terranean surface; and a submersible pump coupled to the electric motor and positionable within a wellbore formed from the terranean surface toward a subterranean formation. The submersible pump is configured to circulate a wellbore fluid through the wellbore toward the terranean surface. The submersible pump includes a plurality of radial stages, with at least one radial stage including one or more shape members integrated with, attached to, or made a part of one or more surfaces of the submersible pump. Each of the one or more shape members is configured to undergo a shape change based at least in part on a characteristic of the wellbore fluid.

In an aspect combinable with the example implementation, the characteristic of the wellbore fluid is at least one of pressure or temperature.

In another aspect combinable with any of the previous aspects, the one or more shape members includes a shape memory alloy.

In another aspect combinable with any of the previous aspects, the shape memory alloy includes at least one of a Nickel and Titanium alloy; a Copper, Zinc and Aluminum alloy; a Copper, Aluminum and Nickel alloy; or an Iron, Manganese and Silicon alloy.

In another aspect combinable with any of the previous aspects, the one or more shape members includes a first shape change member integrated with, attached to, or made a part of an outer surface of a diffuser of the radial stage.

In another aspect combinable with any of the previous aspects, the one or more shape members includes a second shape change member integrated with, attached to, or made a part of an inner surface of the diffuser of the radial stage.

In another aspect combinable with any of the previous aspects, the one or more shape members includes a third shape change member integrated with, attached to, or made a part of a surface of a hub of the radial stage.

In another aspect combinable with any of the previous aspects, the one or more shape members includes a fourth shape change member integrated with, attached to, or made a part of surface of the radial stage adjacent a downthrust washer of the submersible pump.

In another aspect combinable with any of the previous aspects, the one or more shape members includes a fifth shape change member integrated with, attached to, or made a part of surface of the radial stage adjacent an upthrust washer of the submersible pump.

In another aspect combinable with any of the previous aspects, the first shape change member counters a horizontal acting force.

In another aspect combinable with any of the previous aspects, the second shape change member counters the horizontal acting force.

In another aspect combinable with any of the previous aspects, the third shape change member counters the horizontal acting force.

In another aspect combinable with any of the previous aspects, the fourth shape change member counters a down thrust acting force.

In another aspect combinable with any of the previous aspects, the fifth shape change member counters an upthrust acting force.

In another aspect combinable with any of the previous aspects, the at least one radial stage includes a first radial stage and the one or more shape members includes one or more first shape members.

In another aspect combinable with any of the previous aspects, the plurality of radial stages includes a second radial stage including one or more second shape members integrated with, attached to, or made a part of one or more surfaces of the submersible pump.

In another aspect combinable with any of the previous aspects, each of the one or more second shape members is configured to undergo a shape change based at least in part on the characteristic of the wellbore fluid.

In another aspect combinable with any of the previous aspects, the one or more shape members includes a shape memory polymer.

In another aspect combinable with any of the previous aspects, the submersible pump includes a plurality of thrust washers.

In another example implementation, a method for circulating a wellbore fluid from a wellbore includes running an electrical submersible pump (ESP) into a wellbore formed from the terranean surface toward a subterranean formation. The ESP includes an electric motor electrically coupled to a cable coupled to a power source at a terranean surface, and a pump coupled to the electric motor and including a plurality of radial stages, with at least one radial stage including one or more shape members integrated with, attached to, or made a part of one or more surfaces of the pump. The method includes circulating, with the pump, a wellbore fluid through the wellbore, the wellbore fluid defined by a characteristic; in response to a change to the characteristic of the wellbore fluid, adjusting a shape of each of the one or more shape members; and circulating, with the pump having the adjusted shape members, the wellbore fluid through the wellbore.

In an aspect combinable with the example implementation, the characteristic of the wellbore fluid is at least one of pressure or temperature.

In another aspect combinable with any of the previous aspects, the one or more shape members includes a shape memory alloy.

In another aspect combinable with any of the previous aspects, the shape memory alloy includes at least one of a Nickel and Titanium alloy; a Copper, Zinc and Aluminum alloy; a Copper, Aluminum and Nickel alloy; or an Iron, Manganese and Silicon alloy.

In another aspect combinable with any of the previous aspects, adjusting the shape of each of the one or more shape members includes adjusting the shape of a first shape change member integrated with, attached to, or made a part of an outer surface of a diffuser of the radial stage.

In another aspect combinable with any of the previous aspects, adjusting the shape of each of the one or more shape members includes adjusting the shape of a second shape change member integrated with, attached to, or made a part of an inner surface of the diffuser of the radial stage.

In another aspect combinable with any of the previous aspects, adjusting the shape of each of the one or more shape members includes adjusting the shape of a third shape change member integrated with, attached to, or made a part of a surface of a hub of the radial stage.

In another aspect combinable with any of the previous aspects, adjusting the shape of each of the one or more shape members includes adjusting the shape of a fourth shape change member integrated with, attached to, or made a part of surface of the radial stage adjacent a downthrust washer of the submersible pump.

In another aspect combinable with any of the previous aspects, adjusting the shape of each of the one or more shape members includes adjusting the shape of a fifth shape change member integrated with, attached to, or made a part of surface of the radial stage adjacent an upthrust washer of the submersible pump.

Another aspect combinable with any of the previous aspects further includes countering a horizontal acting force with the first shape change member.

Another aspect combinable with any of the previous aspects further includes countering the horizontal acting force with the second shape change member.

Another aspect combinable with any of the previous aspects further includes countering the horizontal acting force with the third shape change member.

Another aspect combinable with any of the previous aspects further includes countering a down thrust acting force with the fourth shape change member.

Another aspect combinable with any of the previous aspects further includes countering an upthrust acting force with the fifth shape change member.

In another aspect combinable with any of the previous aspects, adjusting the shape of each of the one or more shape members includes adjusting a shape of each of one or more first shape members of a first radial stage of the plurality of radial stages; and adjusting a shape of each of one or more second shape members of a second radial stage of the plurality of radial stages.

In another aspect combinable with any of the previous aspects, the one or more shape members includes a shape memory polymer.

In another aspect combinable with any of the previous aspects, the submersible pump includes a plurality of thrust washers.

Implementations of a downhole pump system according to the present disclosure may include one or more of the following features. For example, a downhole pump system according to the present disclosure can avoid improper ESP design based on incorrect design criteria. As another example, a downhole pump system according to the present disclosure can avoid production downtime on wells by sustaining production through proper replacement planning. Further, a downhole pump system according to the present disclosure can standardize an ESP pump and avoid long equipment lead time to provide design changes. Also, a downhole pump system according to the present disclosure can extend ESP operational life through proper operation management. Also, a downhole pump system according to the present disclosure can control flow rates through a pump by contraction or expansion of one or more shape members installed, attached, or integrated with one or more pump stage surfaces.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
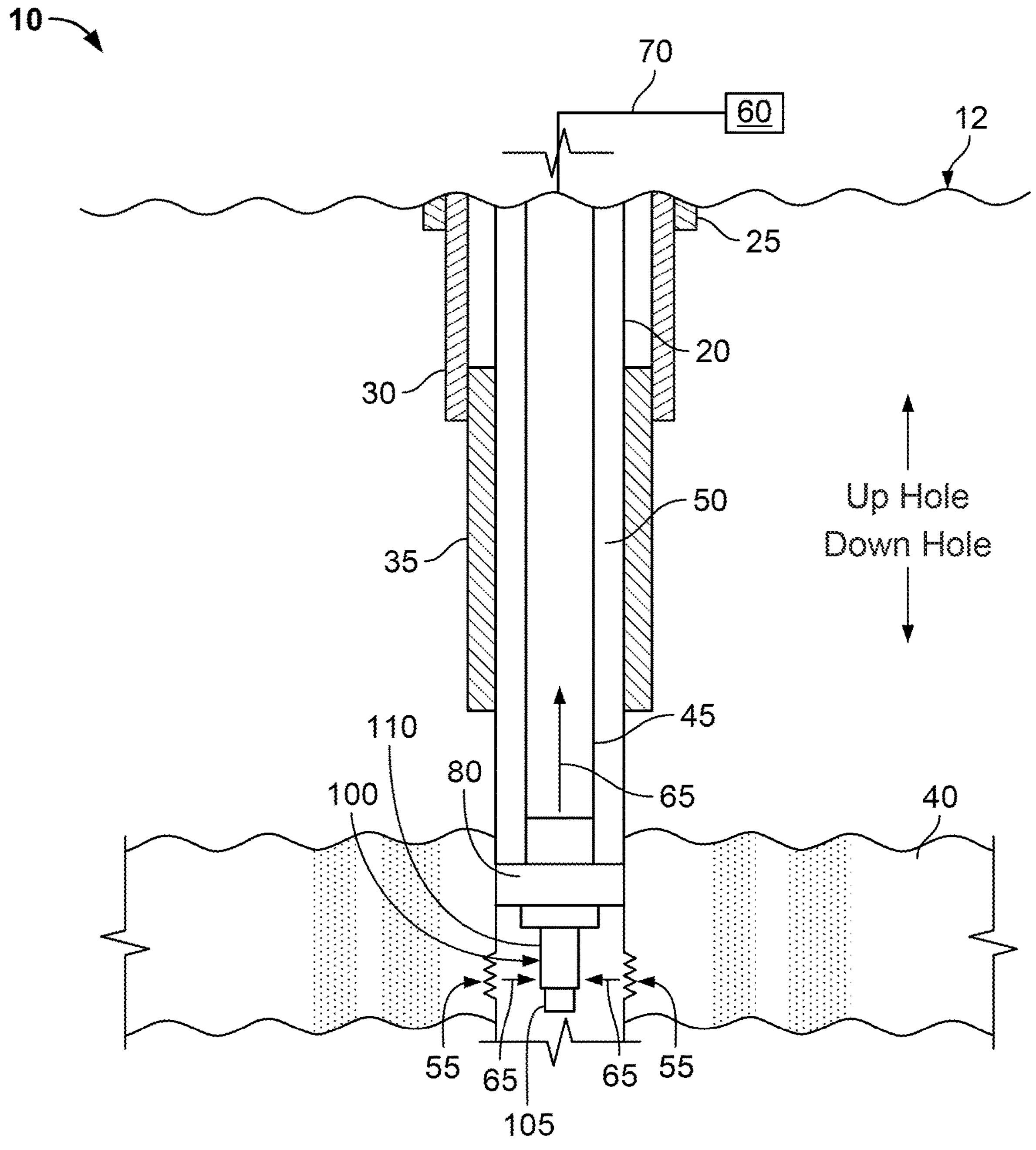
FIG. 1 is a schematic diagram of an example implementation of a downhole pump system according to the present disclosure.

FIG. 1 is a schematic diagram of an example implementation of a downhole pumping system 10 including a downhole pump assembly 100. Generally, FIG. 1 illustrates at least a portion of one implementation of the downhole pumping system 10 according to the present disclosure in which the downhole pump assembly 100 may be run into a wellbore 20 on a wellbore tubular 45 (for example, a production string 45) within the wellbore 20. In this example, an uphole end of the downhole pump assembly 100 is coupled to the production string 45 while the downhole pump assembly 100 is positioned adjacent a subterranean reservoir 40.

Figure 2:
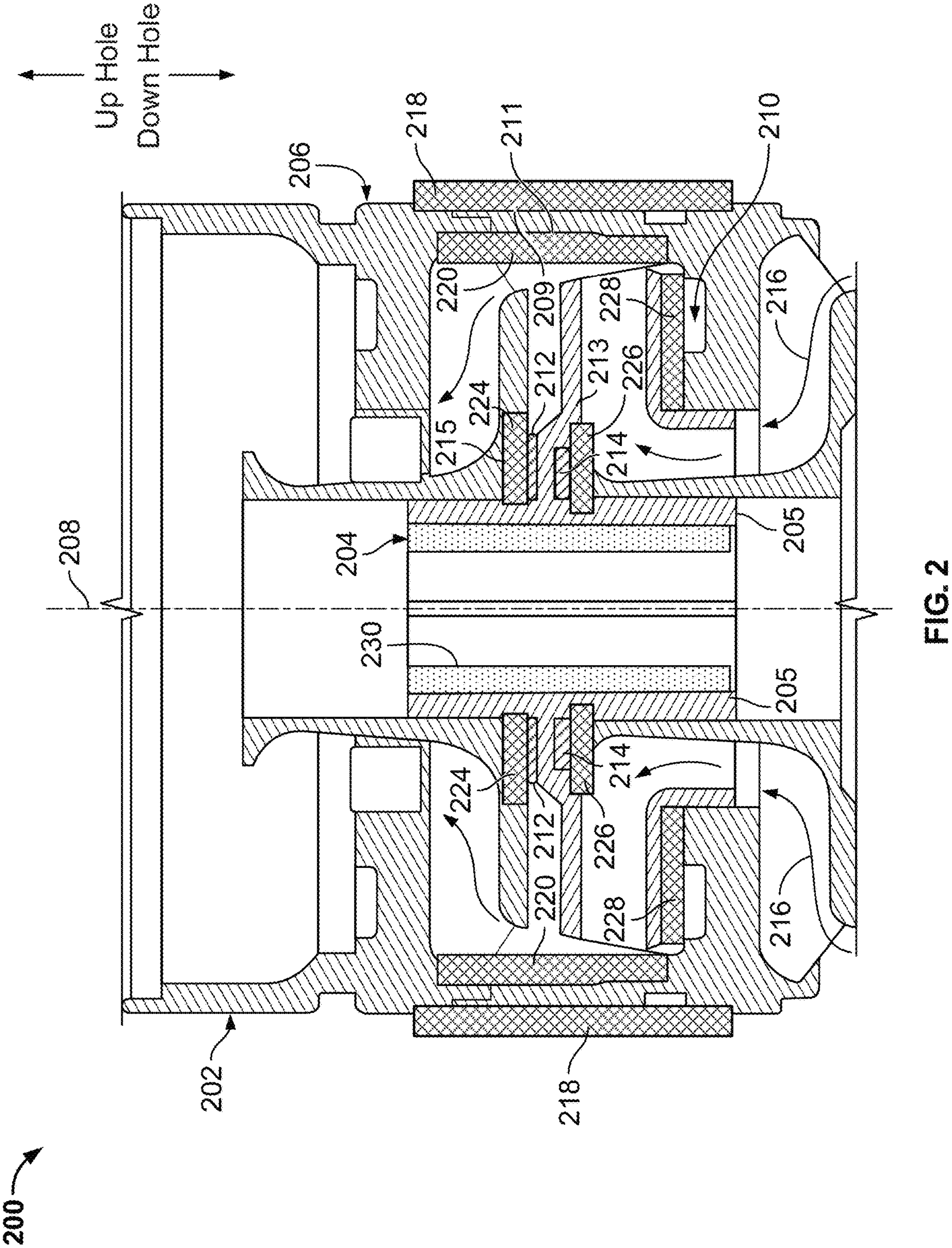
FIG. 2 is a schematic diagram of a cross-section of a stage of a downhole electrical submersible pump (ESP) according to the present disclosure.

In this example implementation, the downhole pump assembly 100 comprises an electric submersible pump (ESP) 100 (a portion of which is shown in FIG. 2) that is operable to circulate a wellbore fluid 65, such as a hydrocarbon fluid (for example, oil, gas, or a mixture thereof) from the subterranean reservoir 40 to a terranean surface 12 (as described in more detail with reference to FIG. 2). In some aspects, the ESP 100, as shown, is positioned on the production string 45 below a wellbore seal 80 (for example, a packer or other seal) that is positioned in the wellbore 20. An annulus 50 is defined between the production string 45 and the wellbore 20.

As described more fully with reference to FIG. 2, in some aspects, the ESP 100 can be configured to have an extended operational life, as well as minimize shutdowns to maintain production of the wellbore fluid 65 from the subterranean reservoir 40 to the terranean surface 12. For example, one or more shape members can be integrated with, attached to, or made a part of one or more internal or external pump surfaces. The one or more shape members, in some aspects, can be made of a shape memory material (SMM) that exhibits shape memory effect (SME) as well as other properties, such as corrosion resistance and superelasticity. Examples of SMMs include shape memory alloy (SMA) and shape memory polymer (SMP). A shape of a SMM can change, for example, based on pressure or temperature of a material in contact with or applied to the SMM. In some cases, a wellbore fluid that is circulated by the ESP 100 can act as the material that adjusts a shape of one or more of the shape members.

As shown, the downhole pumping system 10 accesses the subterranean formation 40 and provides access to hydrocarbons (for example, the wellbore fluid 65) located in such subterranean formation 40. In an example implementation of system 10, the system 10 may be used for a production operation in which the hydrocarbons may be produced from the subterranean formation 40 through the downhole pump assembly 100 and to the wellbore tubular 45 (for example, as a production tubing or casing) uphole of the downhole pump assembly 100. The tubular 45 may represent any tubular member positioned in the wellbore 20 such as, for example, coiled tubing, any type of casing, a liner or lining, a work string (in other words, multiple tubulars threaded together), or other form of tubular member.

A drilling assembly (not shown) may be used to form the wellbore 20 extending from the terranean surface 12 and through one or more geological formations in the Earth. One or more subterranean formations, such as subterranean zone 40, are located under the terranean surface 12. One or more wellbore casings, such as a conductor casing 25, a surface casing 30, and an intermediate casing 35, may be installed in at least a portion of the wellbore 20. Any of the illustrated casings, as well as other casings that may be present in the downhole pumping system 10, may include one or more casing collars.

In some implementations, a drilling assembly used to form the wellbore 20 may be deployed on a body of water rather than the terranean surface 12. For instance, in some implementations, the terranean surface 12 may be an ocean, gulf, sea, or any other body of water under which hydrocarbon-bearing formations may be found. In short, reference to the terranean surface 12 includes both land and water surfaces and contemplates forming and developing one or more downhole pumping systems 10 from either or both locations.

Additionally, in some implementations, the wellbore 20 may be offset from vertical (for example, a slant wellbore). Even further, in some implementations, the wellbore 20 may be a stepped wellbore, such that a portion is drilled vertically downward and then curved to a substantially horizontal wellbore portion. Additional substantially vertical and horizontal wellbore portions may be added according to, for example, the type of terranean surface 12, the depth of one or more target subterranean formations, the depth of one or more productive subterranean formations, or other criteria.

In this example implementation of the downhole pumping system 10, the downhole pump assembly 100 includes a pump 110 coupled to an electric motor 105 (for example, that collectively form the ESP 100). In this example, the wellbore seal 80 is set just uphole of one or more perforations 55 (for example, made in a casing of the wellbore 20) that fluidly couple the subterranean reservoir 40 to the wellbore 20. The electric motor 105 can be operated by electric power provided by power cable 70 (that extends within the annulus 50 to electrically connect with the motor 105). Upon activation, for example by the power supply system 60, the electric motor 105 activates the pump 110 to circulate the wellbore fluid 65 through the perforations 55, into one or more inlets of the pump 110, and into the production string 45 toward the terranean surface 12 as shown.

FIG. 2 is a schematic diagram of a cross-section of the downhole electrical submersible pump (ESP) 100 according to the present disclosure. In particular, FIG. 2 shows a radial stage 200 of the ESP 100, which itself can include multiple radial stages, each of which can be exemplified by the radial stage 200. Thus, although FIG. 2 shows a single radial stage 200 of the ESP 100, ESP 100 includes multiple radial stages 200 connected in series operation to provide fluid lift to wellbore fluid 65 in the wellbore.

As shown in FIG. 2, the radial stage 200 includes a housing 202 that is part of the ESP housing for ESP 100. As a radial stage, this radial stage 200 includes an impeller 204 and a diffuser 206. The impeller 204 is rotatably driven about axis 208 (for example, by the ESP motor) to lift a fluid 216 (for example, liquid or mixed-phase fluid) from a downhole end of the radial stage 200 (for example, from a previous radial stage in the ESP 100) to an uphole end of the radial stage 200 (for example, to a next radial stage in the ESP 100). An eye 210 of the radial stage 200 is located adjacent a downthrust washer, and another downthrust washer 214 is located about a hub 205 of the radial stage 200. An upthrust washer 212 is also located about the hub 205.

As described, one or more shape members can be integrated with, attached to, or made a part of one or more internal or external pump surfaces of the radial stage 200. For example, as shown, shape member 218 is integrated with, attached to, or made a part of an external radial surface 209 of the diffuser 206. In some aspects, shape member 218 can act to counter a horizontal acting force on the radial stage 200. As another example, shape member 220 is integrated with, attached to, or made a part of an internal radial surface 211 of the diffuser 206. In some aspects, shape member 220 can act to counter a horizontal acting force on the radial stage 200. As a further example, shape member 224 is integrated with, attached to, or made a part of pump surface 215 adjacent the upthrust washer 212.

In some aspects, shape member 224 can act to counter an up-thrust force on the radial stage 200. Shape member 226 is integrated with, attached to, or made a part of pump surface 213 adjacent the downthrust washer 214. In some aspects, shape member 226 can act to counter a down-thrust acting force on the radial stage 200. Shape member 230 is integrated with, attached to, or made a part of an internal radial surface 209 of the hub 205. In some aspects, shape member 230 can act to counter a horizontal acting force on the radial stage 200. Shape members 218, 220, 224, 226, 228, and 230 can be made of, for instance, Nitinol (Nickel and Titanium alloy), Copper, Zinc and Aluminum (Cu—Zn—Al) alloys; Copper, Aluminum and Nickel (Cu—Al—Ni) alloys; or Iron, Manganese and Silicon (Fe—Mn—Si) alloys, as examples.

One, some, or all of the shape members 218, 220, 224, 226, 228, and 230 can be included in the radial stage 200 of the ESP 100 (as well as other radial stages of the ESP 100). Additional or alternative shape members can be integrated with, attached to, or made a part of other pump surfaces, such as depending on the operational requirements of the ESP 100.

Each shape member 218, 220, 224, 226, 228, and 230 can be comprised of or formed of a SMA or SMP and change shape based on a pressure, a temperature, or both, of the fluid 216 being circulated by the ESP. For example, as the fluid 216 flows through the radial stage 200, a temperature and/or pressure of the fluid 216 can cause one or more of the shape members 218, 220, 224, 226, 228, and 230 to contract. Oppositely, as the fluid 216 flows through the radial stage 200, a temperature and/or pressure of the fluid 216 can cause one or more of the shape members 218, 220, 224, 226, 228, and 230 to expand. Expansion and contraction can cause the radial stage 200 of the ESP 100 to operate with different characteristics (for example, head and/or flow rate) relative to a conventional pump radial stage that does not include any of shape members 218, 220, 224, 226, 228, and 230. By providing for this expansion and contraction, the ESP 100 can remain in operation even during changing well and reservoir parameters and requirements that can include: pressure, temperature, flow rate, fluid composition and well-bore geometry, as the shape members can act to change flow path geometry through the ESP 100, as well as through implementation of different force effects that allow the stages to change shape and/or dimension that can lead to extended run life and accommodation of production changes.

Thus, with knowledge of present or future characteristics of the fluid 216, one or more shape members 218, 220, 224, 226, 228, and 230 can be applied to the radial stage 200 (and/or other radial stages of ESP 100) so that ESP 100 can operate with multiple operational characteristics: operation with shape members in an initial shape without expansion or contraction; operation with shape members in an expanded shape; and operation with shape members in a contracted shape. In some aspects, one or some of the shape members 218, 220, 224, 226, 228, and 230 may be in a contracted shape (or initial shape) during operation while other(s) of the shape members 218, 220, 224, 226, 228, and 230 may be in an expanded shape (or initial shape) during operation.

Figure 3:
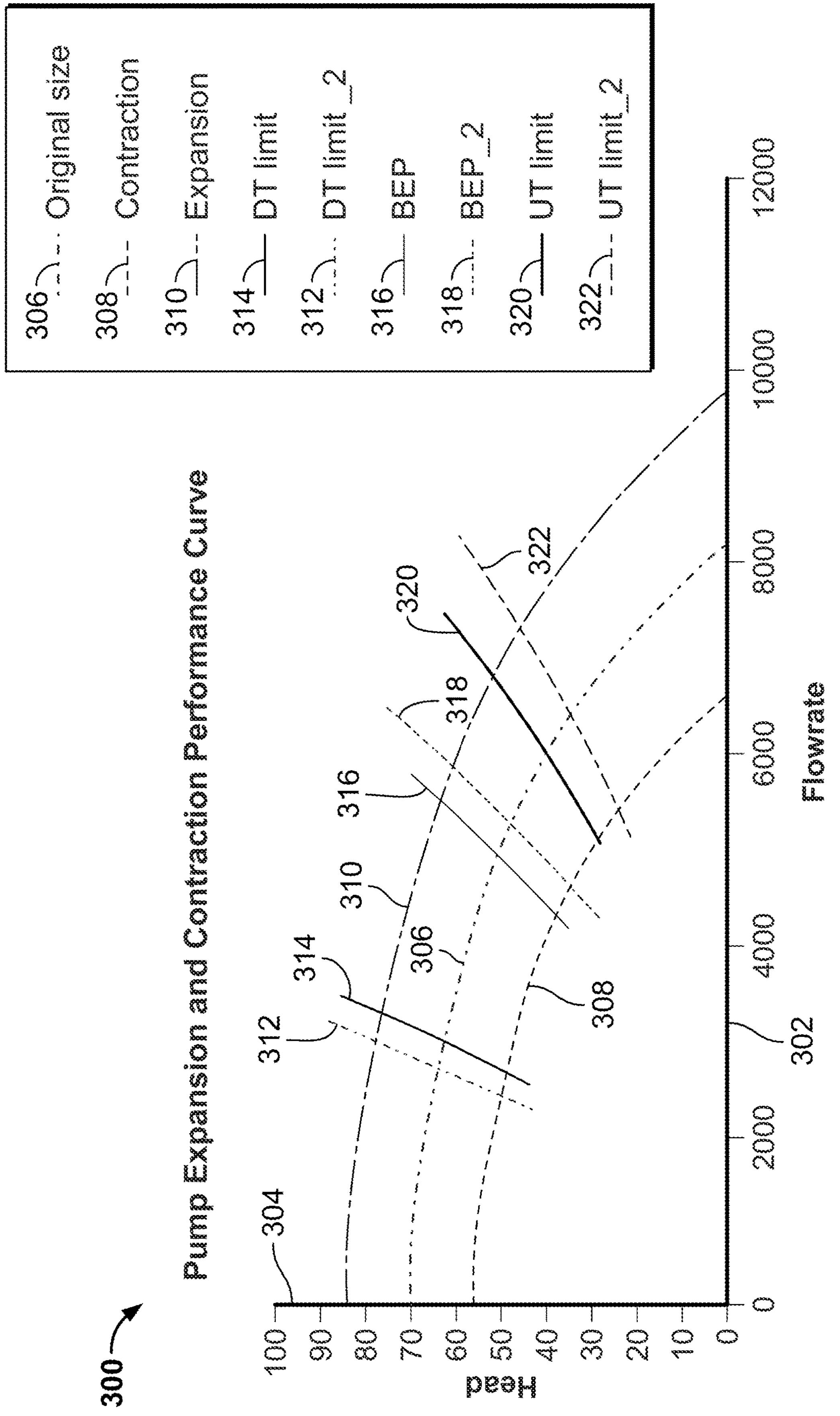
FIG. 3 is a graph that shows multiple pump curves of a downhole ESP according to the present disclosure.

FIG. 3 is a graph 300 that shows multiple pump curves of a downhole electrical submersible pump (ESP) according to the present disclosure. For example, graph 300 shows example pump curves for ESP 100 including radial stage 200 as the pump operates in the three operational states: shape members at an initial shape, shape members in a contracted state; and shape members in an expanded state. Graph 300 includes x-axis 302 of flow rate (in units of volumetric flow rate, such as gallons per minute or barrels per day) and y-axis 304 of head (in units of psi or feet lifted).

Pump curve 306 shows operation of the ESP 100 with the shape members of radial stage 200 (or additional radial stages as well) in an initial or original shape (in other words, not contracted nor expanded). Pump curve 308 shows operation of the ESP 100 with the shape members of radial stage 200 (or additional radial stages as well) in a contracted shape. As shown, the ESP 100 provides lesser performance (lower flow rates at lower heads) as compared to pump curve 306. Pump curve 310 shows operation of the ESP 100 with the shape members of radial stage 200 (or additional radial stages as well) in an expanded shape. As shown, the ESP 100 provides greater performance (higher flow rates at higher heads) as compared to pump curve 306. For example, as one or more pump stages expand by expansion of one or more shape members, higher lifting capabilities due to higher flow rate can occur. Alternatively, as one or more pump stages contract by contraction of one or more shape members, lower lifting capabilities due to lower flow rate can occur, where a lower flow rate is entering the pump stage. The expanded pump stage can generate bigger head and higher drawdown, which translates to a higher flow rate.

Graph 300 shows additional pump characteristics as well. For example, graph 300 shows a DT limit 314, which is a down-thrust limit. Down-thrust is a force that acts on a pump stage where the lifted fluid acts as a downward force on the pump stage. Graph 300 also shows a UT limit 320, which is an up-thrust limit, where the lifted fluids act as an upward force on pump stages. Graph 300 also shows BEP 316, which is a best efficiency point. From an ESP pump curve, the recommended operation range of ESPs (ROR) should be inside the DT limit 314 and the UT limit 320 (and more preferably closer to the BEP 316) to have the best lifting efficiency and avoid damaging the pump. Operating out of recommended range (below DT limit 314 or above the UT limit 320, can damage the ESP and potentially cause failure if operated out of range for a long time.

The described example implementations of the shape members can re-adjust the DT limit, the UT limit, and the BEP to accommodate different fluid lifting ranges through adjusting limits. The expansion or contraction can be adjusted to cover different lifting rates (e.g., expansion no. 1, 2, 3, etc.) or contraction (no. 1, 2, 3, etc.) where expansion no. 3>2>1 and contraction no. 3<2<1 to cover multiple ranges. This adjustment also occurs with the BEP (no. 1, 2, 3, etc.). Thus, as shown on graph 300 an adjusted DT limit_2 312, an adjusted UT limit_2 322, and an adjusted BEP_2 318 are shown.

The limits can be autonomously adjusted by fluid pressures/temperatures inside wellbore (based on downhole pump sensor values) and/or through user inputs from a surface controller (for example, commands to expand/contract the shape members) by applying pressure/temperature forces to adjust stages. Additional connections (for example, tubing from a pump housing to a surface controller) can be added to allow user input commands (for example, incorporated inside the ESP 110 in FIG. 1).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A downhole pumping system, comprising:

an electric motor configured to receive electric power from a cable coupled to a power source at a terranean surface; and a submersible pump coupled to the electric motor and positionable within a wellbore formed from the terranean surface toward a subterranean formation, the submersible pump configured to circulate a wellbore fluid through the wellbore toward the terranean surface, the submersible pump comprising a plurality of radial stages, with at least one radial stage of the plurality of radial stages comprising a plurality of shape change members attached to one or more surfaces of the submersible pump, each of the plurality of shape change members configured to undergo a shape change based at least in part on a characteristic of the wellbore fluid, the plurality of shape change members comprising:

a first shape change member attached to an outer radial surface of a diffuser of the at least one radial stage and configured to counter a horizontal acting force;

a second shape change member attached to an inner radial surface of the diffuser of the at least one radial stage and configured to counter the horizontal acting force;

a third shape change member attached to a surface of a hub of the at least one radial stage and configured to counter the horizontal acting force;

a fourth shape change member attached to a surface of the at least one radial stage adjacent a downthrust washer of the submersible pump and configured to counter a down thrust acting force; and a fifth shape change member attached to a surface of the at least one radial stage adjacent an upthrust washer of the submersible pump and configured to counter an upthrust acting force.

2. The downhole pumping system of claim 1, wherein the characteristic of the wellbore fluid is at least one of pressure or temperature.

3. The downhole pumping system of claim 2, wherein the plurality of shape change members comprises a shape memory alloy.

4. The downhole pumping system of claim 3, wherein the shape memory alloy comprises at least one of a Nickel and Titanium alloy; a Copper, Zinc and Aluminum alloy; a Copper, Aluminum and Nickel alloy; or an Iron, Manganese and Silicon alloy.

5. The downhole pumping system of claim 2, wherein the plurality of shape change members comprises a shape memory polymer.

6. The downhole pumping system of claim 2, wherein the submersible pump comprises a plurality of thrust washers.

7. The downhole pumping system of claim 1, wherein the plurality of shape change members comprises a shape memory alloy.

8. The downhole pumping system of claim 7, wherein the shape memory alloy comprises at least one of a Nickel and Titanium alloy; a Copper, Zinc and Aluminum alloy; a Copper, Aluminum and Nickel alloy; or an Iron, Manganese and Silicon alloy.

9. The downhole pumping system of claim 1, wherein the plurality of shape change members comprises a shape memory polymer.

10. The downhole pumping system of claim 1, wherein the submersible pump comprises a plurality of thrust washers.

11. A method for circulating a wellbore fluid from a wellbore, comprising:

running an electrical submersible pump (ESP) into the wellbore formed from a terranean surface toward a subterranean formation, the ESP comprising:

an electric motor electrically coupled to a cable coupled to a power source at the terranean surface, and a pump coupled to the electric motor and comprising a plurality of radial stages, with at least one radial stage comprising a plurality of shape change members attached to one or more surfaces of the pump, the plurality of shape change members comprising a first shape change member, a second shape change member, a third shape change member, a fourth shape change member, and a fifth shape change member;

circulating, with the pump, the wellbore fluid through the wellbore, the wellbore fluid defined by a characteristic;

in response to a change to the characteristic of the wellbore fluid, adjusting a shape of each of the plurality of shape change members, the adjusting comprising:

adjusting the shape of the first shape change member attached to an outer radial surface of a diffuser of the at least one radial stage to counter a horizontal acting force; and adjusting the shape of the second shape change member attached to an inner radial surface of the diffuser of the at least one radial stage to counter the horizontal acting force;

adjusting the shape of the third shape change member attached to a surface of a hub of the at least one radial stage to counter the horizontal acting force;

adjusting the shape of the fourth shape change member attached to a surface of the at least one radial stage adjacent a downthrust washer of the submersible pump to counter a down thrust acting force;

adjusting the shape of the fifth shape change member attached to a surface of the at least one radial stage adjacent an upthrust washer of the submersible pump to counter an upthrust acting force; and circulating, with the pump having the adjusted shape members, the wellbore fluid through the wellbore.

12. The method of claim 11, wherein the characteristic of the wellbore fluid is at least one of pressure or temperature.

13. The method of claim 12, wherein the plurality of shape change members comprises a shape memory alloy.

14. The method of claim 13, wherein the shape memory alloy comprises at least one of a Nickel and Titanium alloy; a Copper, Zinc and Aluminum alloy; a Copper, Aluminum and Nickel alloy; or an Iron, Manganese and Silicon alloy.

15. The method of claim 12, wherein the plurality of shape change members comprises a shape memory polymer.

16. The method of claim 12, wherein the submersible pump comprises a plurality of thrust washers.

17. The method of claim 11, wherein the plurality of shape change members comprises a shape memory alloy.

18. The method of claim 17, wherein the shape memory alloy comprises at least one of a Nickel and Titanium alloy; a Copper, Zinc and Aluminum alloy; a Copper, Aluminum and Nickel alloy; or an Iron, Manganese and Silicon alloy.

19. The method of claim 11, wherein the plurality of shape change members comprises a shape memory polymer.

20. The method of claim 11, wherein the submersible pump comprises a plurality of thrust washers.

* * * * *